(12) United States Patent
Fukunaga

(10) Patent No.: US 12,091,037 B2
(45) Date of Patent: Sep. 17, 2024

(54) FUELING INFORMATION PROVISION SYSTEM AND METHOD FOR PROVIDING FUELING INFORMATION

(71) Applicant: TOYOTA JIDOSHA KABUSHIKI KAISHA, Toyota (JP)

(72) Inventor: Takashi Fukunaga, Toyota (JP)

(73) Assignee: TOYOTA J I DOSHA KABUSHI KI KAI SHA, Toyota (JP)

( * ) Notice: Subject to any disclaimer, the term of this patent is extended or adjusted under 35 U.S.C. 154(b) by 55 days.

(21) Appl. No.: 18/192,778

(22) Filed: Mar. 30, 2023

(65) Prior Publication Data
US 2023/0347922 A1 Nov. 2, 2023

(30) Foreign Application Priority Data
Apr. 28, 2022 (JP) .................................. 2022-074566

(51) Int. Cl.
*B60W 50/14* (2020.01)

(52) U.S. Cl.
CPC ....... *B60W 50/14* (2013.01); *B60W 2050/143* (2013.01); *B60W 2050/146* (2013.01); *B60W 2530/213* (2020.02); *B60W 2556/50* (2020.02)

(58) Field of Classification Search
CPC ............ G07C 9/00309; G07C 9/00857; G07C 9/00896; G07C 2009/00452; G07C 2009/00468; G07C 2009/00865; G07C 2009/00928; G07C 9/00571; G07C 2009/00793; B60W 50/14; B60W 2530/213; B60W 2050/143; B60W 2050/146
See application file for complete search history.

(56) References Cited

U.S. PATENT DOCUMENTS

| | | | |
|---|---|---|---|
| 7,487,672 B2 * | 2/2009 | Tatsuno | G09F 9/33 362/210 |
| 11,155,457 B2 * | 10/2021 | Nishimura | B67D 7/02 |
| 11,572,268 B1 * | 2/2023 | Dudar | B67D 7/344 |
| 2008/0302442 A1 * | 12/2008 | Miceli | B67D 7/42 141/1 |
| 2015/0242855 A1 * | 8/2015 | Vilnai | H04N 7/183 705/44 |
| 2016/0023886 A1 * | 1/2016 | Braden | B67D 7/34 141/94 |
| 2018/0099859 A1 * | 4/2018 | Dudar | B67D 7/342 |
| 2018/0237288 A1 * | 8/2018 | Moyne | B67D 7/425 |
| 2024/0116745 A1 * | 4/2024 | Dudar | B60P 3/2205 |
| 2024/0135351 A1 * | 4/2024 | Georgiadis | G06Q 20/3224 |

FOREIGN PATENT DOCUMENTS

JP 2017-171105 A 9/2017

* cited by examiner

*Primary Examiner* — Curtis J King
(74) *Attorney, Agent, or Firm* — Oblon, McClelland, Maier & Neustadt, L.L.P.

(57) ABSTRACT

A fueling information provision system includes a storage device, a CPU serving as an execution device, and a location information obtaining device that obtains a location of a vehicle. The storage device stores fuel nozzle data about a fuel nozzle color assigned to a fuel type used by the vehicle in each of predetermined regions. The CPU transmits a notification signal indicating that the fuel nozzle color has changed when the location of the vehicle obtained by the location information obtaining device has shifted from the first region to the second region.

8 Claims, 3 Drawing Sheets

| | Registered Region | Fuel Nozzle Color | Type of Region |
|---|---|---|---|
| Region A | — | First Color | First Region |
| Region B | ○ | First Color | First Region |
| Region C | — | First Color | First Region |
| Region D | — | Second Color | Second Region |
| Region E | — | First Color | First Region |
| Region F | — | First Color | First Region |
| Region G | — | Second Color | Second Region |
| Region H | — | First Color | First Region |

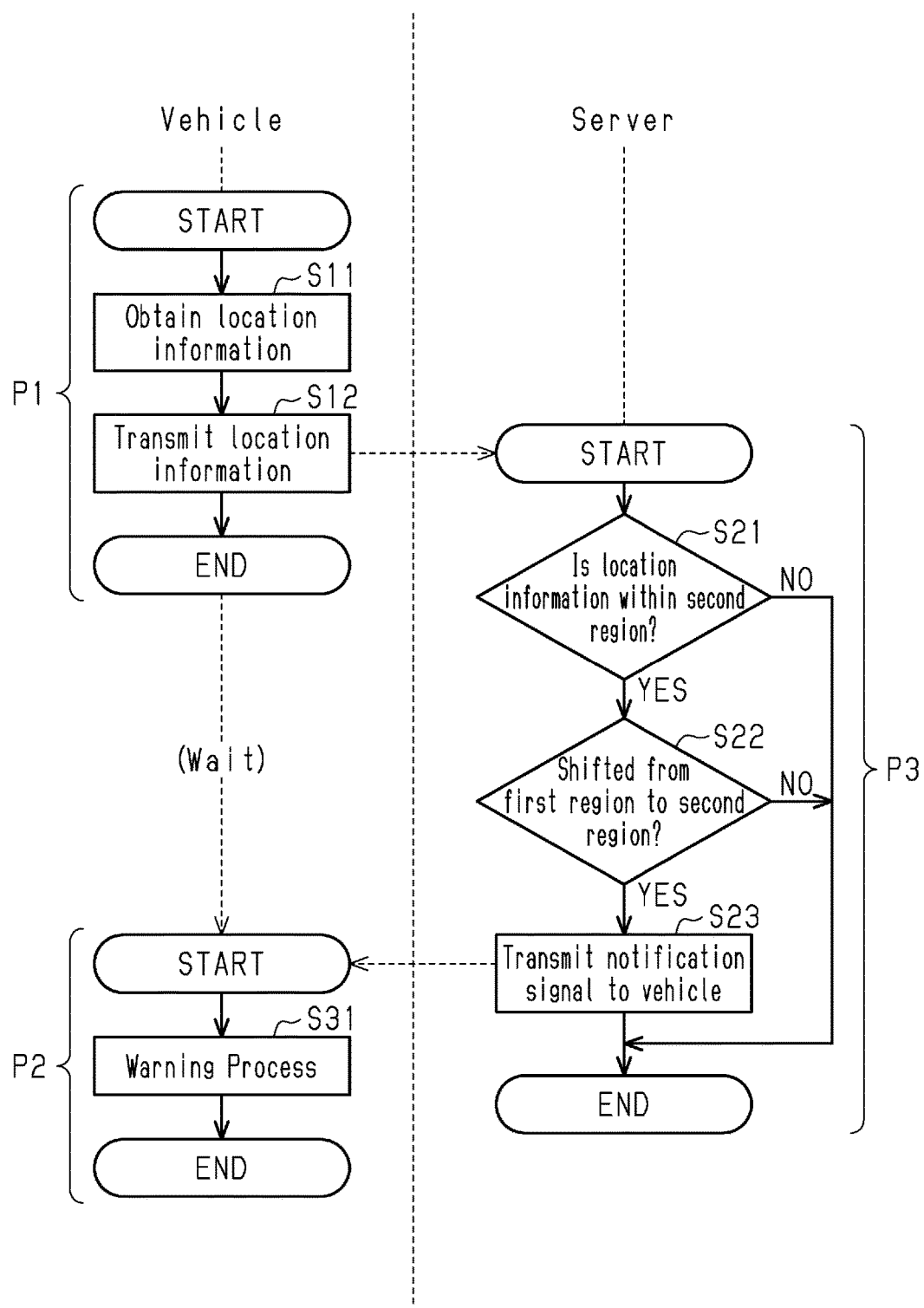

FUELING INFORMATION PROVISION SYSTEM AND METHOD FOR PROVIDING FUELING INFORMATION

BACKGROUND

1. Field

The following description relates to a fueling information provision system and a method for providing fueling information.

2. Description of Related Art

Japanese Laid-Open Patent Publication No. 2017-171105 describes a vehicle controller and an onboard imaging device. The onboard imaging device captures an image of an imaging portion including a filler opening and generates data about the image. The vehicle controller obtains the image data from the onboard imaging device. The vehicle controller distinguishes the color of a fuel nozzle that approaches the filler opening of the vehicle from the image data. Then, the vehicle controller compares the fuel nozzle color distinguished from the image data with the color assigned in advance to each type of fuel to determine whether the user is about to use the correct type of fuel.

The vehicle controller described in Japanese Laid-Open Patent Publication No. 2017-171105 is applied when the fuel type and the nozzle color have a one-to-one relationship. However, even if the fuel type is the same, the color used for the fuel nozzle may differ between regions. When the fuel nozzle color differs between regions in this manner, the user may fuel the vehicle with the wrong fuel.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a fueling information provision system is provided. The fueling information provision system includes a storage device, an execution device, and a location information obtaining device that obtains a location of a vehicle. The storage device stores fuel nozzle data about a fuel nozzle color assigned to a fuel type used by the vehicle in each of predetermined regions. The regions include a first region where the fuel nozzle color is a first color and a second region where the fuel nozzle color is a second color that differs from the first color. The execution device includes processing circuitry. The processing circuitry is configured to transmit a notification signal indicating that the fuel nozzle color has changed when the location of the vehicle obtained by the location information obtaining device has shifted from the first region to the second region.

In another general aspect, a method for providing fueling information is provided. The method includes obtaining a location of a vehicle and transmitting a notification signal indicating that a fuel nozzle color has changed when the location of the vehicle has shifted from a first region to a second region. In the method, a fuel nozzle color is assigned to a fuel type used by the vehicle in each of predetermined regions. Further, the first region is one of the regions where the fuel nozzle color is a first color. Further, the second region is another one of the regions where the fuel nozzle color is a second color that differs from the first color.

Other features and aspects will be apparent from the following detailed description, the drawings, and the claims.

BRIEF DESCRIPTION OF THE DRAWINGS

FIG. 2 is a table of fuel nozzle data in the embodiment.

FIG. 3 is a flowchart of a process that provides fueling information in the embodiment.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
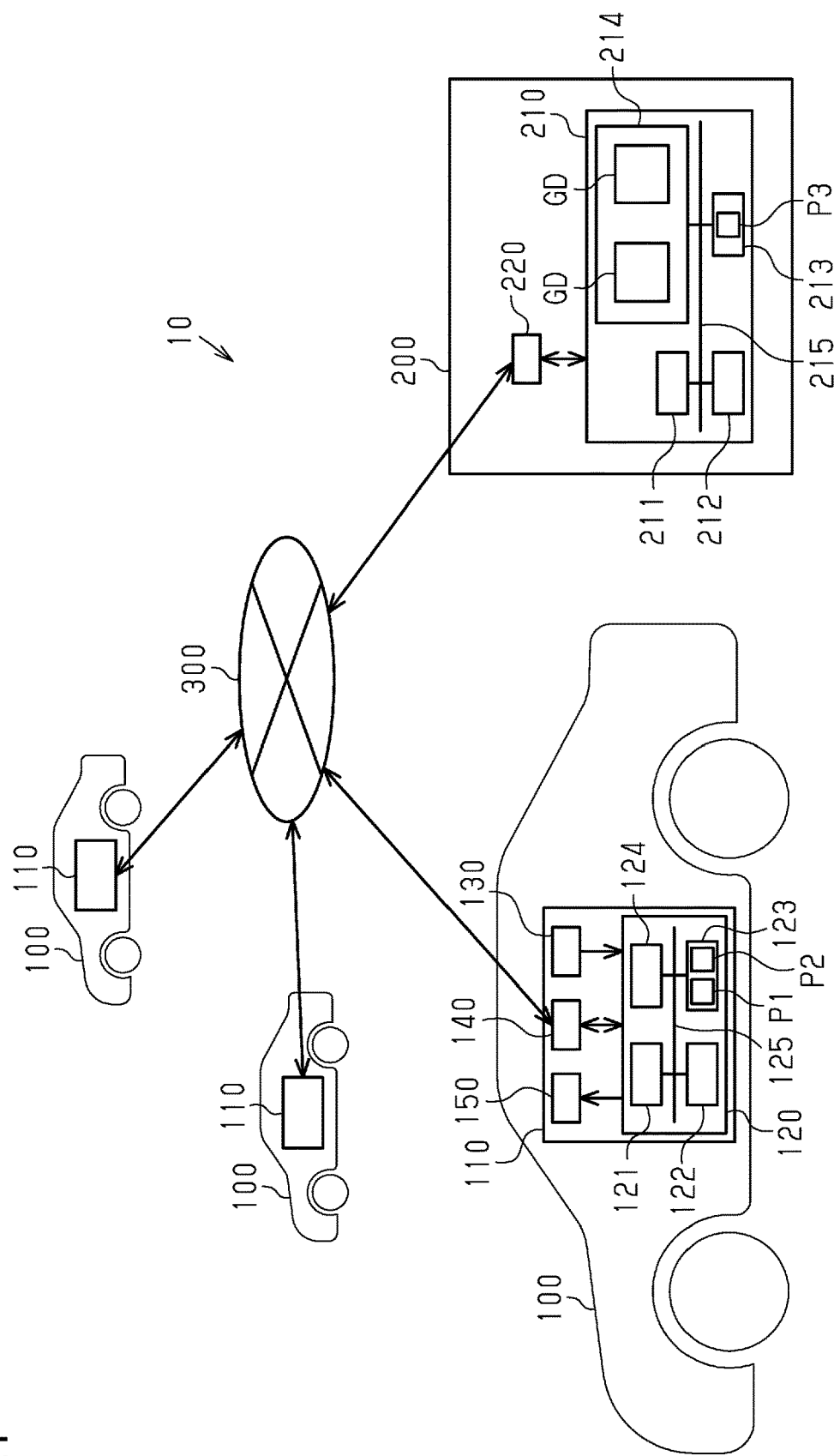
FIG. 1 is a schematic view of a fueling information provision system according to one embodiment.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Embodiment

A fueling information provision system according to one embodiment will now be described with reference to the drawings.

As shown in FIG. 1, a fueling information provision system 10 includes a control module 110 installed in a vehicle 100 and a server 200 that collects and stores information from vehicles 100. The server 200 is connected to the control module 110 over an external communication network 300. The external communication network 300 is, for example, a wireless communication line such as a mobile phone line. Thus, the control module 110 and the server 200 communicate with each other over the external communication network 300. The vehicles 100 each include the control module 110. In other words, the fueling information provision system 10 includes control modules 110.

The control module 110 of the vehicle 100 includes a vehicle controller 120, a location information obtaining device 130, a vehicle communication device 140, and a warning device 150.

The vehicle controller 120 includes a CPU 121, a peripheral circuit 122, ROM 123, a storage device 124, and a bus 125. The CPU 121, the peripheral circuit 122, the ROM 123, and the storage device 124 are connected by the bus 125 in a manner allowing for communication with one another. The peripheral circuit 122 includes a circuit that generates clock signals for synchronizing internal operations, a power supply circuit, a reset circuit, and the like. The ROM 123 stores various types of programs to allow the CPU 121 to perform various types of control. Specifically, the ROM 123 stores a vehicle location transmission program P1 and a warning program P2. The CPU 121 executes the programs stored in the ROM 123. The processes in the vehicle location transmission program P1 and the warning program P2 will be described later.

The location information obtaining device 130 obtains the coordinates of the current location of the vehicle 100. The location information obtaining device 130 is a global positioning system (GPS) device. The vehicle communication device 140 communicates with the server 200 over the external communication network 300. The warning device 150 is a loudspeaker that generates a sound. The warning device 150 uses the sound to warn a user. An example of sound generated by the warning device 150 is a voice announcing that "the fuel nozzle color in this region is XYZ."

The server 200 includes a server controller 210 and a server communication device 220. The server communication device 220 communicates with the control module 110 of the vehicle 100 over the external communication network 300.

The server controller 210 includes a CPU 211 serving as an execution device, a peripheral circuit 212, ROM 213, a storage device 214, and a bus 215. The CPU 211, the peripheral circuit 212, the ROM 213, and the storage device 214 are connected by the bus 215 in a manner allowing for communication with one another. The peripheral circuit 212 includes a circuit that generates clock signals for synchronizing internal operations, a power supply circuit, a reset circuit, and the like. The ROM 213 stores various types of programs to allow the CPU 211 to perform various types of control. Specifically, the ROM 213 stores a fueling information provision program P3. The CPU 211 executes the programs stored in the ROM 213. The process in the fueling information provision program P3 will be described later.

The storage device 214 stores fuel nozzle data GD for each vehicle 100. Although FIG. 1 shows only two sets of fuel nozzle data GD, the number of sets of fuel nozzle data GD stored in the storage device 214 is the same as the number of vehicles 100 included in the fueling information provision system 10. As shown in FIG. 2, the fuel nozzle data GD indicates, for each region, the fuel nozzle color assigned in advance to the fuel type used by the vehicle 100.

Specifically, the fuel nozzle data GD indicates the fuel nozzle color assigned to the fuel type in each of region A to region H. For example, region A to region H each represent an administrative unit such as a country, a state, a province, a prefecture, a city, or a town. In the example shown in FIG. 2, the color of a fuel nozzle in region A is a first color, the fuel nozzle color in region B is the first color, the fuel nozzle color in region C is the first color, and the fuel nozzle color in region D is a second color. The fuel nozzle color in region E is the first color, the fuel nozzle color in region F is the first color, the fuel nozzle color in region G is the second color, and the fuel nozzle color in region H is the first color. Specifically, the first color is green and the second color is black.

The storage device 214 also stores, from the regions in the fuel nozzle data GD, the region that is registered and associated with the vehicle 100. The registered region is registered by, for example, the user of the vehicle 100 as the region where the vehicle 100 is often used or the region where the vehicle 100 is stored. In the example shown in FIG. 2, region B is the registered region.

The storage device 214 categorizes the regions in the fuel nozzle data GD into two types of regions. The storage device 214 categorizes the regions where the fuel nozzle color is the same as the fuel nozzle color of the registered region as first regions, and regions where the fuel nozzle color differs from the fuel nozzle color of the registered region as second regions. Thus, the storage device 214 stores region A, region B, region C, region E, region F, and region H as the first regions. Further, the storage device 214 stores region D and region G as the second regions.

A series of processes performed in the fueling information provision system 10 and related to a notification signal indicating a change in the fuel nozzle color will now be described. The CPU 121 of the vehicle controller 120 and the CPU 211 of the server controller 210 cooperate to perform the series of processes related to the notification signal. Specifically, the CPU 121 of the vehicle controller 120 executes the vehicle location transmission program P1 and the warning program P2. Further, the CPU 211 of the server controller 210 executes the fueling information provision program P3. This implements the series of processes related to the notification signal. Each program in the series of processes related to the notification signal will now be described.

Process that Transmits Vehicle Location

The CPU 121 of the vehicle controller 120 repeatedly executes the vehicle location transmission program P1 in predetermined cycles when the vehicle 100 is in an ON state. The CPU 121 repeats the process in predetermined cycles, for example, every minute. The vehicle 100 is switched to an OFF state or an ON state when a start switch of the vehicle 100 is operated.

As shown in FIG. 3, when staring the vehicle location transmission program P1, the CPU 121 first performs step S11. In step S11, the CPU 121 obtains a location information signal indicative of the coordinates of the current location of the vehicle 100 obtained by the location information obtaining device 130. Then, the CPU 121 proceeds to step S12.

In step S12, the CPU 121 transmits the location information signal indicative of the coordinates of the current location of the vehicle 100 from the vehicle communication device 140 to the server 200 over the external communication network 300. This ends the vehicle location transmission program P1 executed by the CPU 121. Then, the CPU 121 waits to start the process of the warning program P2 that will be described later.

Process that Provides Fueling Information

When the server 200 receives the location information of the vehicle 100, the CPU 211 of the server controller 210 performs the process of the fueling information provision program P3.

When starting the process of the fueling information provision program P3, the CPU 211 first performs step S21. In step S21, the CPU 211 determines whether the coordinates of the current location indicated by the location information of the vehicle 100 are within the second region. The second region is a region where the fuel nozzle color differs from the fuel nozzle color in the registered region. When the coordinates of the current location of the vehicle 100 are within the second region (S21: YES), the CPU 211 proceeds to step S22.

In step S22, the CPU 211 determines whether the location of the vehicle 100 has shifted from the first region to the second region. In the first region, the fuel nozzle color is the same as the fuel nozzle color in the registered region. In the second region, the fuel nozzle color differs from the fuel nozzle color in the registered region. In other words, the CPU 211 determines whether the vehicle 100 has shifted to a region where the fuel nozzle color differs from that in the registered region.

Specifically, the CPU 211 performs the determination of step S22 in the following manner. As described above, the CPU 121 of the vehicle controller 120 repeatedly executes the vehicle location transmission program P1. Thus, the server 200 repeatedly receives the location information of the vehicle 100 from the vehicle 100. The CPU 211 determines from two pieces of location information that are consecutive in time whether the location information that is older than the location information used for the determination in step S21 indicates the first region. In other words, when the older location information is within the first region and the latest location information is within the second region, the CPU 211 determines that the location of the vehicle 100 has shifted from the first region to the second region. Otherwise, the CPU 211 determines that the location of the vehicle 100 has not shifted from the first region to the second region. Specifically, when the older location information and the latest location information are both within the second region, the CPU 211 determines that the location of the vehicle 100 has not shifted from the first region to the second region. When the location of the vehicle 100 has shifted from the first region to the second region (S22: YES), the CPU 211 proceeds to step S23.

In step S23, the CPU 211 transmits a notification signal to the vehicle 100 indicating that the fuel nozzle color has changed to the second color. Specifically, the CPU 211 transmits the notification signal from the server communication device 220 to the vehicle 100 over the external communication network 300. This ends the process of the fueling information provision program P3 executed by the CPU 211.

In step S21, when determining that the coordinates of the current location indicated by the location information of the vehicle 100 are outside the second region (S21: NO), the CPU 211 ends the process of the fueling information provision program P3. In step S22, when determining that the location information of the vehicle 100 has not shifted from the first region to the second region (S22: NO), the CPU 211 ends the process of the fueling information provision program P3. In this manner, the CPU 211 performs step S23 only when the location of the vehicle 100 has shifted from the first region to the second region. In other words, when the location of the vehicle 100 remains in the first region or the second region, the CPU 211 does not transmit a notification signal. Further, the CPU 211 does not transmit a notification signal regardless of whether the fuel nozzle color has changed when the location of the vehicle 100 shifts from the second region to the first region.

Process that Transmits Warning

When the vehicle 100 receives the notification signal, the CPU 121 of the vehicle controller 120 executes the process of the warning program P2.

When executing the warning program P2, the CPU 121 performs step S31. In step S31, the CPU 121 operates the warning device 150 based on the received notification signal to perform a warning process that warns the user of the vehicle 100 that the fuel nozzle color has changed to the second color.

Specifically, in the warning process of step S31, the CPU 121 operates the warning device 150, which is a loudspeaker, to output a voice announcing that the fuel nozzle color has changed to the second color. In this manner, the CPU 121 warns the user of the vehicle 100 that the fuel nozzle color has changed to the second color. This ends the process of the warning program P2 executed by the CPU 121.

Operation of Embodiment

In the above embodiment, the vehicle 100 transmits the location information of the vehicle 100 to the server 200 in predetermined cycles. The CPU 211 of the server 200 determines the region where the vehicle 100 is located from the received location information. When the vehicle 100 travels from the first region to the second region, the CPU 211 of the server communication device 220 transmits a notification signal to the vehicle 100.

Advantages of Embodiment (1) In the above embodiment, when the location of the vehicle 100 has shifted from the first region to the second region, the CPU 211 transmits a notification signal indicating that the fuel nozzle color has changed. Thus, the control module 110 of the vehicle 100 that receives the notification signal recognizes that the fuel nozzle color used to fuel the vehicle 100 is no longer the first color. This allows the user to recognize that the fuel nozzle color has changed through the warning device 150 of the control module 110 that receives the notification signal. As a result, the possibility of the user using the wrong fuel nozzle will be reduced when the user performs fueling in the second region.

(2) In the above embodiment, the vehicle 100 includes the location information obtaining device 130, and the server 200 includes the CPU 211, which serves as an execution device, and the storage device 214. The fuel nozzle data GD is stored in the storage device 214. If the fuel nozzle data GD were to be stored in each vehicle 100, to renew the fuel nozzle data GD, an operation for renewing the data would have to be performed on each vehicle 100. In the above embodiment, the storage device 214 storing the fuel nozzle data GD is installed in the server 200 and the operation for renewing the data only needs to be performed on the server 200. In other words, renewal of the fuel nozzle data GD in the server 200 will allow the fuel nozzle data GD for vehicles 100 to be renewed.

(3) In the above embodiment, the control module 110 performs the warning process by operating the warning device 150. The control module 110 issues a warning to the user of the vehicle 100 by performing the warning process. This allows the user of the vehicle 100 to be aware that the fuel nozzle color has changed.

(4) In the above embodiment, the first color is the fuel nozzle color in the registered region. The CPU 211 of the server controller 210 transmits a notification signal when the location of the vehicle 100 has shifted to the second region where the fuel nozzle color is not the first color. Thus, the CPU 211 transmits the notification signal when the fuel nozzle color has changed from the accustomed first color to the unaccustomed second color. In contrast, the CPU 211 does not transmit the notification signal regardless of whether the fuel nozzle color has changed when the location of the vehicle 100 has shifted from the second region, where the fuel nozzle color is the second color, to the first region, where the fuel nozzle color is the first color. Thus, the CPU 211 does not transmit the notification signal when the fuel nozzle color has changed to the accustomed first color. This avoids a situation in which the notification signal is transmitted too often.

(5) In the above embodiment, the notification signal indicates that the fuel nozzle color has changed to the second color. This allows the user of the vehicle 100 to be aware that the fuel nozzle color has changed and also that the fuel nozzle color has changed to the second color.

OTHER EMBODIMENTS

The above-described embodiment and the following modification can be combined if the combined modifications remain technically consistent with each other.

The storage device 214 may store the first regions such as region A, region B, region C, region E, region F, and region H categorized into registered regions that are registered in advance in association with the vehicle 100 and non-registered regions that differ from the registered regions.

In this modified example, the CPU 211 does not transmit a notification signal to the vehicle 100 when the location of the vehicle 100 shifts from the second region to the registered location in a first region. Thus, the warning device 150 is not activated. In this case, the location of the vehicle 100 will be returned from the second region to the accustomed registered region, and the user will know that the first color is the fuel nozzle color in the registered region. Thus, the warning device 150 does not need to warn the user that the fuel nozzle color has changed.

In contrast, when the location of the vehicle 100 shifts from the second region to the non-registered location in a first region, the CPU 211 transmits a notification signal to the vehicle 100. Thus, the warning device 150 is activated. In this case, the location of the vehicle 100 is shifted from the second region to an unaccustomed non-registered region, where the user may not know that the first color is the fuel nozzle color in the non-registered region. Thus, by warning the user that the fuel nozzle color has changed with the warning device 150, the user will be able to know that the fuel nozzle color in the non-registered region is the first color rather than the second fuel nozzle color in the second region. Thus, this modified example improves the convenience of the fueling information provision system 10 without the notification signal being transmitted too often.

The vehicle controller 120 and the server controller 210 may be implemented by circuitry including one or more processors that execute various types of processes according to a computer program (software). The vehicle controller 120 and the server controller 210 may be implemented by circuitry including one or more dedicated hardware circuits such as application-specific integrated circuits (ASIC) that execute at least part of various types of processes or a combination thereof. The processor includes a CPU and memory such as RAM and ROM. The memory stores program codes or instructions configured to cause the CPU to execute processes. The memory, or computer-readable media, include any type of media that are accessible by general-purpose computers and dedicated computers.

In the server controller 210, the storage device 214 may be the ROM 213. In this case, the ROM 213 may store the fuel nozzle data GD so that the ROM 213 serves as a storage device.

The notification signal may only indicate that the fuel nozzle color has changed. In other words, the notification signal does not have to indicate change to the second color. Even in such a case, the user of the vehicle 100 will not use the wrong fuel nozzle if the user is notified that the fuel nozzle color has changed.

The fuel nozzle data GD may include data about fuel nozzle colors of different fuel types. The fuel nozzle data GD only needs to include data about the fuel nozzle colors for the fuel types used by the vehicles 100.

The data format of the fuel nozzle data GD is not limited to the example of the above embodiment. For example, the fuel nozzle data GD may include data about the fuel nozzle colors assigned in different regions and data about the registered region of each vehicle 100. In this case, the CPU 211 may refer to the two sets of data. Further, in this case, the storage device 214 may store data about the fuel nozzle color assigned in only one of the regions.

The first color does not need to be the fuel nozzle color in the registered region. For example, the first color may be the fuel nozzle color in a region where the vehicle 100 is switched to an ON state. If the first color is the fuel nozzle color in the region where the vehicle 100 is switched to the ON state, a notification signal may be transmitted when the location of the vehicle 100 has shifted from the region to another region where the fuel nozzle color changes. In this case, the notification signal is transmitted if the fuel nozzle color has changed when the location of the vehicle 100 travels across the border between regions regardless of the fuel nozzle color in the registered region.

If three or more fuel nozzle colors are used for the same type of fuel, the storage device 214 may categorize the first to third colors in the fuel nozzle data GD. Further, if there are three or more fuel nozzle colors, the storage device 214 may store the first to third colors categorized together with the first to third regions in the fuel nozzle data GD. Further, if the registered region is registered, the storage device 214 may store two types of regions regardless of the number of the fuel nozzle colors, such as the first region where the fuel nozzle color is the same as the registered region, and the second region where the fuel nozzle color differs from the registered region.

The storage device 214 may store two or more registered regions where the fuel nozzle color is the same.

The warning process is not limited to the example of the above embodiment. For example, when the warning device 150 includes a display, the warning device 150 may output a warning image. Further, the warning process may transmit a message to a mobile terminal of the user of the vehicle 100.

The control module 110 of the vehicle 100 does not need to perform the warning process. For example, when receiving the notification signal, the control module 110 may stop a determination process in a typical controller such as that described in Japanese Laid-Open Patent Publication No. 2017-171105 or change a determination result.

The fueling information provision system 10 does not need to include the server 200. For example, the fueling information provision system 10 may include only the vehicle 100. Further, the ROM 123 of the vehicle controller 120 may store the fueling information provision program P3, and the storage device 124 may store the fuel nozzle data GD. In this case, the CPU 121 of the vehicle controller 120 executes the fueling information provision program P3 to implement the functionality of an execution device.

The location information obtaining device 130 does not need to be installed in the vehicle 100. For example, the mobile terminal of the user of the vehicle 100 may include the location information obtaining device 130. In this case, for example, the storage device 214 of the server 200 may store information in which the vehicle 100 is associated with the mobile terminal of the user in advance by the user.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A fueling information provision system, comprising:
a storage device;
an execution device; and
a location information obtaining device that obtains a location of a vehicle, wherein
the storage device stores fuel nozzle data about a fuel nozzle color assigned to a fuel type used by the vehicle in each of predetermined regions,
the regions include a first region where the fuel nozzle color is a first color and a second region where the fuel nozzle color is a second color that differs from the first color, and
the execution device includes processing circuitry, wherein the processing circuitry is configured to transmit a notification signal indicating that the fuel nozzle color has changed when the location of the vehicle obtained by the location information obtaining device has shifted from the first region to the second region.

2. The fueling information provision system according to claim 1, wherein the vehicle is one of vehicles, the fueling information provision system further comprising:
control modules installed in the vehicles, respectively; and
a server connected to the control modules over an external communication network, wherein
the vehicles each include the location information obtaining device, and
the server includes the storage device and the processing circuitry.

3. The fueling information provision system according to claim 2, wherein
the vehicles each further include a warning device that issues a warning to a user of the vehicle,
the processing circuitry is configured to transmit the notification signal to at least one of the control modules, and
the control module is configured to operate the warning device upon reception of the notification signal to perform a warning process that warns the user of the vehicle that the fuel nozzle color has changed.

4. The fueling information provision system according to claim 1, wherein
the first color is a fuel nozzle color in a registered region that is registered in advance in association with the vehicle, and
the processing circuitry is configured not to transmit the notification signal regardless of whether the fuel nozzle color has changed when the location of the vehicle obtained by the location information obtaining device has shifted to the first region.

5. The fueling information provision system according to claim 1, wherein the processing circuitry is configured to transmit the notification signal indicating that the fuel nozzle color has changed to the second color when the location of the vehicle obtained by the location information obtaining device has shifted from the first region to the second region.

6. The fueling information provision system according to claim 1, wherein
the first region includes a registered region that is registered in advance in association with the vehicle and a non-registered region that differs from the registered region, and
the processing circuitry is configured not to transmit the notification signal when the location of the vehicle obtained by the location information obtaining device has shifted from the second region to the first region.

7. The fueling information provision system according to claim 6, wherein
the processing circuitry is configured not to transmit the notification signal when the location of the vehicle obtained by the location information obtaining device has shifted from the second region to the registered region, and
the processing circuitry is configured to transmit the notification signal when the location of the vehicle has shifted from the second region to the non-registered region.

8. A method for providing fueling information, the method comprising:
obtaining a location of a vehicle; and
transmitting a notification signal indicating that a fuel nozzle color has changed when the location of the vehicle has shifted from a first region to a second region, wherein
a fuel nozzle color is assigned to a fuel type used by the vehicle in each of predetermined regions,
the first region is one of the regions where the fuel nozzle color is a first color, and
the second region is another one of the regions where the fuel nozzle color is a second color that differs from the first color.

* * * * *

UNITED STATES PATENT AND TRADEMARK OFFICE
CERTIFICATE OF CORRECTION

PATENT NO. : 12,091,037 B2  
APPLICATION NO. : 18/192778  
DATED : September 17, 2024  
INVENTOR(S) : Takashi Fukunaga Page 1 of 1

It is certified that error appears in the above-identified patent and that said Letters Patent is hereby corrected as shown below:

On the Title Page

Item (73), the Assignee information is incorrect. Item (73) should read:
- (73) Assignee: TOYOTA JIDOSHA KABUSHIKI KAISHA, Toyota (JP) -

Signed and Sealed this  
Fifteenth Day of April, 2025

Coke Morgan Stewart  
*Acting Director of the United States Patent and Trademark Office*